United States Patent [19]

Götmalm

[11] Patent Number: 4,747,369

[45] Date of Patent: May 31, 1988

[54] DEVICE FOR BREEDING FISH

[75] Inventor: Örjan Götmalm, Kullavik, Sweden

[73] Assignee: Farmocean AB, Gothenburg, Sweden

[21] Appl. No.: 887,805

[22] PCT Filed: Nov. 14, 1985

[86] PCT No.: PCT/SE85/00457

§ 371 Date: Jul. 18, 1986

§ 102(e) Date: Jul. 18, 1986

[87] PCT Pub. No.: WO86/03097

PCT Pub. Date: Jun. 5, 1986

[30] Foreign Application Priority Data

Nov. 21, 1984 [SE] Sweden ............................... 8405854

[51] Int. Cl.[4] .............................................. A01K 61/00
[52] U.S. Cl. ................................... 119/3; 114/264
[58] Field of Search ...................... 119/1, 2, 3; 114/264

[56] References Cited

U.S. PATENT DOCUMENTS

| | | | |
|---|---|---|---|
| 3,653,358 | 4/1972 | Fremont | 119/3 |
| 4,003,338 | 1/1977 | Neff et al. | 119/3 |
| 4,086,874 | 5/1978 | Sterner | 179/3 |
| 4,108,102 | 8/1978 | Lindström | 114/264 |

FOREIGN PATENT DOCUMENTS

| | | | |
|---|---|---|---|
| 80414 | 6/1983 | European Pat. Off. | 119/3 |
| 2051254 | 4/1971 | France . | |
| 2440689 | 7/1980 | France | 119/3 |
| 8503411 | 8/1985 | PCT Int'l Appl. | 119/3 |

*Primary Examiner*—John E. Murtagh
*Assistant Examiner*—Caroline D. Dennison
*Attorney, Agent, or Firm*—Cushman, Darby & Cushman

[57] ABSTRACT

A device for breeding fish and the like in open sea or lake in at least a netted bag (12), which at its upper part is supported by a pontoon (11), the depth position of which is variable. The purpose is to provide a breeding device which on one hand allows an upper cover also for very big bags, and on the other hand can be boarded also by bigger ships and independent of the wind conditions, and furthermore is designed thus that the taking up of fish can be carried out in simple way without bigger manual work. These tasks have been solved thereby that at the side of the pontoon (11) facing away from the netted bag (12) there is arranged a stand (18) which is tapering in the direction upwards for supporting a freely rotatable platform (23), to which a boarding gangway (24) is articulatedly connected, and that a sinker (16) having water as ballast is arranged at the lower end of the netted bag (12), which sinker and thereby the bottom (14) of the netted bag (12) is liftable to the water surface by blowing the tanks of the sinker.

9 Claims, 2 Drawing Sheets

DEVICE FOR BREEDING FISH

The present invention refers to a device for breeding fish and the like in open sea or lake in at least one netted bag which is supported by a pontoon, the depth position of which is variable.

BACKGROUND OF THE INVENTION

When breeding fish there is produced materials which in high concentrations negatively will influence the growth balance in the surrounding medium, such as the sea or the lake. High concentrations appear upon breeding in smaller lakes, basins or at breeding in bays and near the seashores. The environmental pollution load will be a disturbance in direct proportion to the amount of fish raised and the water exchange ratio. The water exchange ratio increases exponentially very rapidly with an increased distance from e.g. a seashore and is at deep waters as big that such an emission of otherwise environmental pollution load increasing materials will be considered as very marginal. Hitherto the breeding of fish in open waters have mainly been carried out to an experimental extent. Selfsupporting breeding plants having volumes about 10,000 $m^2$ are today built but these plants cannot be located in open waters where the water exchange rate is satisfactorily without substantial reconstruction.

The breeding plants hitherto designed mainly have consisted of annular pontoons, which also are used as a working bridge and which carries one or more netted bags which by means of sinkers enclose a bigger or smaller water volume. The pontoons can be a rigid tubular structure or a number of floating bodies upon which bridges have been attached. These plants are however quite inappropriate in open sea, where waves several meters high can occur. It has also been suggested pontoons shaped as very coarse rubber hoses be used. Plants made in such a manner have proved also to stand very heavy sea but they have a negative effect which arises when the rubber tubes follow the movement of the waves, whereby the netted bag at irregular upwards and downwards movements will have a stressing influence on the fish.

A problem with big breeding plants adapted to open sea or lakes, which for instance can have a diameter of 40–50 meters, is the handling of the fish when taking up the fish, which has been brought about by lifting the netted bag, but the boarding and the transfer of loads such as fodder for the fish from a ship to the breeding plant can also, due to the rough sea, be a problem. Another problem at big breeding plants is that they preferably should be closable also at the top to prevent birds and other unauthorized creatures to reach the contents of the netted bag.

THE PURPOSE AND MOST ESSENTIAL FEATURES OF THE INVENTION

The purpose of the present invention is to make possible breeding of fish in open waters, whereby the environmental pollution loads are no longer a problem. Another purpose is to provide, also for very big breeding plants, an upper cover and such a design that the breeding plant certainly is adaptble to waves, but yet so rigid that the fish is not stressed by the movements of the netted bag. It should furthermore be easy to board the breeding plant independent of the wind conditions and the device should be so designed that the taking up of the fish can be carried out entirely without manual work. These tasks have been solved thereby that at the side of the pontoon facing away from the netted bag there is provided a stand, being tapering in a direction upwards for supporting a freely rotatable platform, to which is articulatedly attached a boarding gangway, and that a sinker having water as ballast is provided at the lower en of the netted bag, which sinker and thereby also the bottom of the netted bag can be lifted to the water surface by blowing the tanks of the sinker.

DESCRIPTION OF THE DRAWINGS

The invention will hereinafter be described with reference to the drawings, which show some embodiments.

DESCRIPTION OF THE EMBODIMENTS

Figure 1:
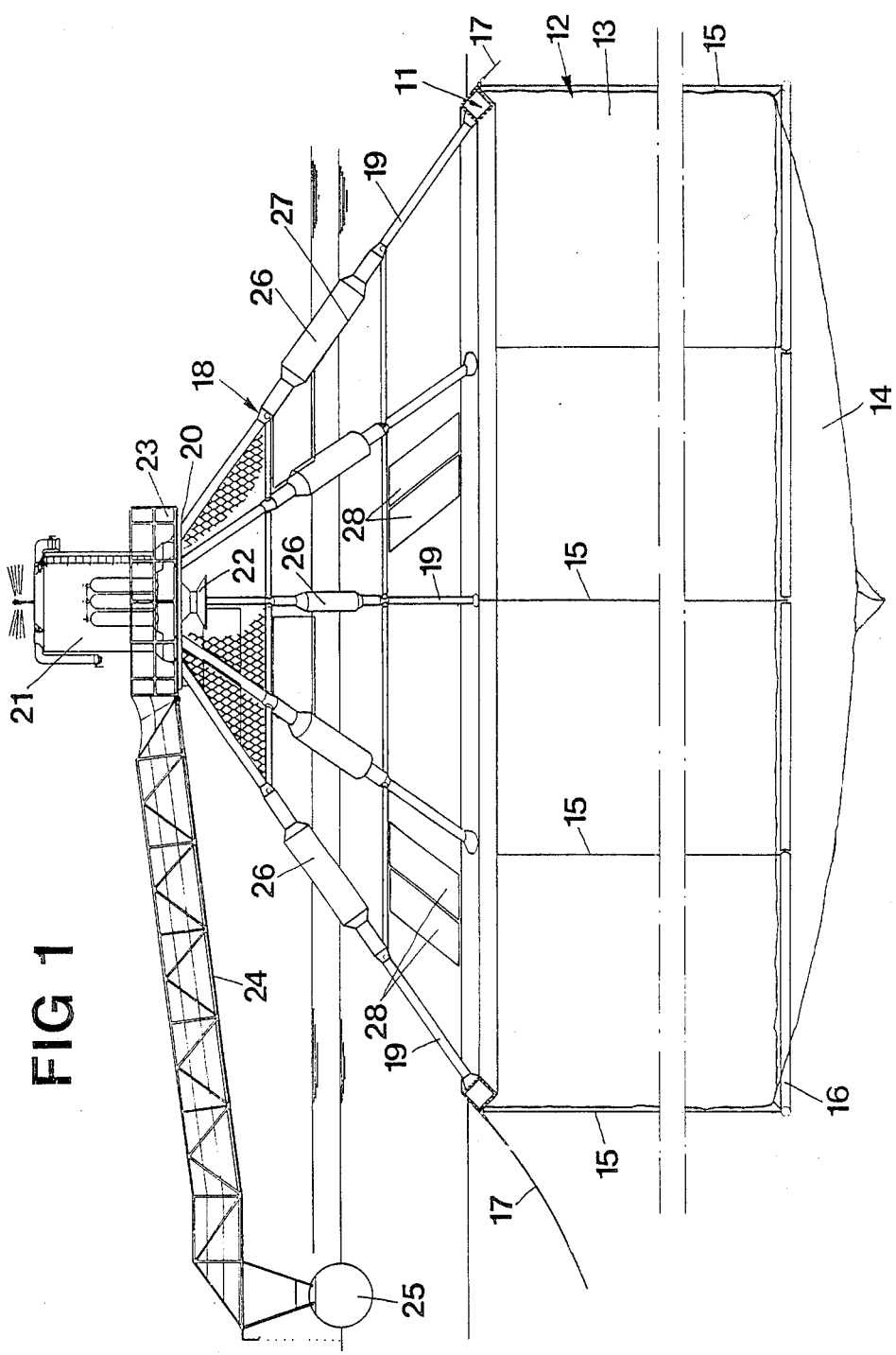
FIG. 1 shows a section through a breeding plant according to the invention.

The breeding plant according to the invention incorporates a frame shaped pontoon 11 having round (FIGS. 3, 4 and 5) or polygonal shape (FIGS. 1 and 2) and which consists of a tube or several interconnected tube sections, the displacement of which is variable by filling or emptying the internal free volume of the pontoon with water, thus that the pontoon can be brought to take up a certain floating position. The pontoon also preferbly can have sections, where it is entirely or partly filled by a floating material, e.g. a light, not water absorbing material such as polyurethane foam, which gives the pontoon a certain net lift. To the pontoon 11 is attached a netted bag 12 consisting of vertical walls 13 and a bottom 14. To the pontoon is also attached a number of pliable connecting members 15, e.g. chains, which at their opposite ends each carry a sinker 16, to which the transition portion between the walls 13 and the bottom 14 of a netted bag is connected.

The sinkers 16 also have variable displacement and during breeding they are filled with water as ballast, which by means of blowing and introduction of air can be brought to lift the bottom 14 of the netted bag to level with the pontoon 11. This also forms an attachment for a number of attachment means such as wires 17 or the like, which at their free ends are provided with anchoring means (not shown) for anchoring the breeding device to the sea or lake bottom.

The cross section of the pontoons is preferably square with the diagonals coinciding with the vertical and horizontal planes resp. The side of a pontoon facing inwards/upwards also acts as a support and attachment for a stand 18, which is tapering in a direction upwards and consists of a frame 19 which at its upper end, facing away from the pontoon, carries a platform 20 upon which is arranged a house 21, which i.e. encloses a fodder plant for the fish, which automatically mixes and via a feeding device 22 feeds proper amounts of fish fodder at predetermined times. The house also encloses the driving device which is required for the operation of the breeding device. Around the house 21 is also arranged a rotating platform 23 resting on the platform 20 and having articulatedly connected thereto a boarding gangway 24, a buoy 25 being fitted to the free end thereof. The free pivotability of the platform 23 and the boarding gangway makes it possible always to board the breeding plant in lee and at a safe distance from the netted bag.

Figure 2:
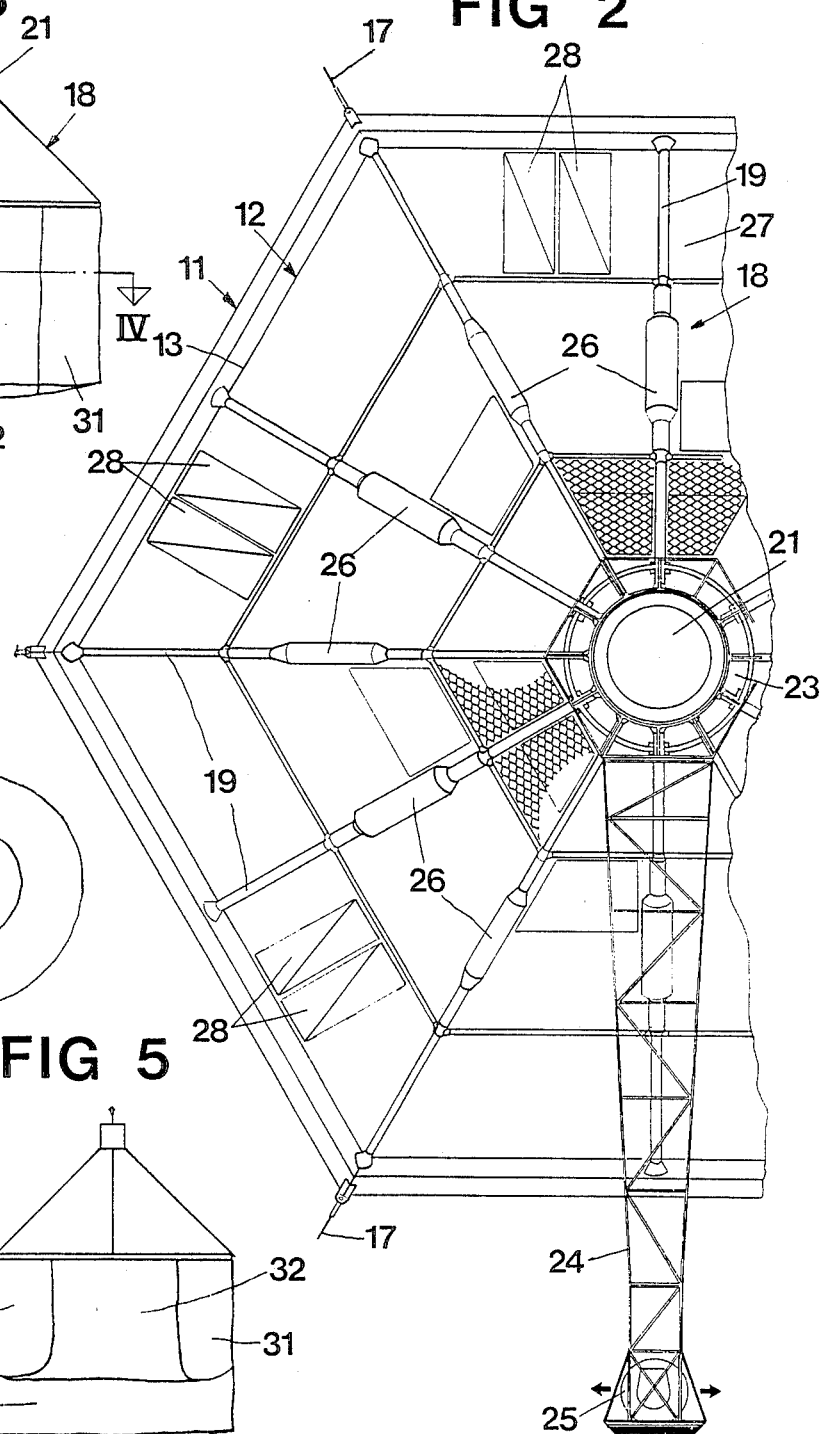
FIG. 2 shows the breeding plant according to FIG. 1 in a view from above.

The frame 19 of the pontoon 11 is provided with a cylindrical floating bodies 26 preferably arranged in the longitudinal direction, which together with the pontoon 11 make it possible that the main part of the displacement of the breeding device is located a distance below the water surface, where the wave movements and thereby the wave energy acting upon the netted bag is much reduced, as shown in FIG. 1 the structure water line of the breeding device is located in level with the floating bodies 26. The frame 19 also acts as a supporting structure for cover 27 covering the upper part of the netted bag e.g. in the form of a coarse meshed steel metal net. Via a number of doors 28 provided in the net cover 27 it is possible to reach to the interior of the netted bag 12.

During the very breeding period the breeding device as shown in FIG. 1 is balanced at such a level where only the upper half of the stand frame is situated above the water surface. Also ships having a comperatively big draught can therefore bearth at the boarding gangway 24 when unloading the fodder, filling up fuel and at general servicing of the device. When taking up the fish raised and also when fry is placed in the netted bag the tanks of the pontoon 11 are blown thus that the pontoon will be situated in level with the water surface. The contents of the netted bag are made accessible thereby that also the floating tanks of the sinker 16 are blown free from ballast thus that the bottom 14 of the netted bag are lifted up gradually towards the sea surface. The taking up of the fish is preferably carried out by means of a conventional suction device.

Figure 3:
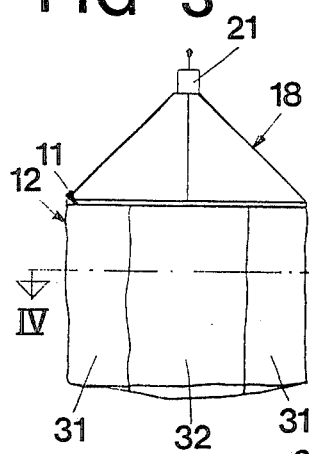
FIG. 3 shows in smaller scale a side view of a modified breeding plant.
Figure 4:
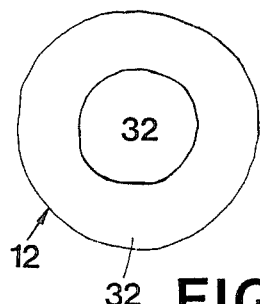
FIG. 4 shows a section along line IV—IV in FIG. 3.
Figure 5:
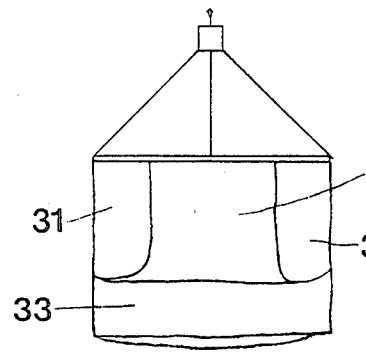
FIG. 5 shows a side view of a further embodiment of the breeding plant according to the invention.

In order effectively to use the breeding volume of the netted bag this can be divided in a number of concentrical departments 31 and 32 such as shown in FIGS. 3–5. This division gives a maximum swimming distance for the fish. It is also possible to divide only a certain part of the netted bag in concentric compartments, whereas the upper or lower part 33 has a full cross sectional surface.

The invention is not limited to the embodiments shown but a plurality of variations are possible within the scope of the appended claims.

I claim:

1. A device for breeding fish and the like in an open body of water such as the sea or a lake, said device including at least one netted bag having upper and lower portions, pontoon means for supporting the netted bag and having depth control means for varying the depth position of the device in the water, wherein the improvement comprises said pontoon means having an upper side facing generally away from the netted bag, said upper side supporting a stand and a platform carried by said stand so as to be freely rotatable with respect to said stand, said platform being articulatedly connected to a boarding gangway, said device further including sinker means connected to said lower portion of said netted bag and having tank means for raising and lowering said sinker means by control of the water ballast in said tank means whereby the position of the netted bag relative to the water surface can be varied.

2. A device according to claim 1, characterized thereby, that the pontoon means and parts of the stand (18) are filled with a non-water absorbing light, material e.g. polyurethane foam, the volume of which is so chosen that a certain floating level is obtained during normal operational conditions.

3. A device according to claim 1 or 2, characterized thereby, that the pontoon means has a square cross section, the diagonals of which coincide with the vertical and horizontal planes respectively.

4. The device as claimed in claim 1 or 2 wherein said pontoon means has a hollow portion and said depth control means comprises means for regulating the filling of said hollow portion with a fluid.

5. A device according to claim 1, characterized thereby, that a number of pliable connecting means are connected to the sinker means, which members interconnect the sinker means with the pontoon means whereby the interconnecting member at the lifting of the sinker means successively will increase its load influence upon the sinker means.

6. A device according to claim 1, characterized thereby, that the stand (18) is provided with cylindrical floating bodies.

7. A device according to claim 1, characterized thereby, that the stand has a frame which is arranged to carry a net formed cover closing the upper portion of the netted bag.

8. A device according to claim 1, characterized thereby, that a buoy is connected to the outer free end of the boarding gangway.

9. A device according to claim 1, characterized thereby, that the breeding volume of the netted bag is divided in at least two concentrical compartments where at least one compartment has the same depth as the netted bag.

* * * * *